United States Patent [19]
Bailey

[11] Patent Number: 5,608,625

[45] Date of Patent: Mar. 4, 1997

[54] SYSTEM AND METHOD FOR FORMATTING POSITION-SENSITIVE DATA

[75] Inventor: Wayne P. Bailey, Longmont, Colo.

[73] Assignee: International Business Machines Corporation, Armonk, N.Y.

[21] Appl. No.: 269,333

[22] Filed: Jun. 30, 1994

[51] Int. Cl.⁶ .............................. G06F 17/24; G06F 3/14
[52] U.S. Cl. ............................................. 395/793; 395/803
[58] Field of Search ........................... 364/419.1, 419.13, 364/419.14, 419.15, 419.17, 419.19; 395/148, 149, 147

[56] References Cited

U.S. PATENT DOCUMENTS 4,538,183  8/1985  Kanno et al. .
4,905,185  2/1990  Sakai .
5,070,478  12/1991  Abbott .

OTHER PUBLICATIONS

Mastering WordPerfect 5.1 & 5.2 for Windows, Alan Simpson, Sybex Inc., pp. 138–142 and Ch. 23 1993.

*Primary Examiner*—Gail O. Hayes
*Assistant Examiner*—Steven R. Yount
*Attorney, Agent, or Firm*—Robert M. Carwell

[57] ABSTRACT

The entry and editing of position-sensitive data such as character strings is accomplished via a two-phase system. In the first or "definition" phase, position-sensitive data, which may be or include words or phrases, is identified. In addition, positional rules for formatting and/or substituting the data (such as text for each word or phrase) are either defined or selected from a pre-existing list. In the second or "edit/update" phase, the document being edited or updated is scanned to locate such position-sensitive data, which may include the words/phrases. The positional relationship between respective words/phrases or other data in a particular group is utilized to determine which rules to apply when modifying the document, in order to automatically reformat or substitute new data such as a new character string.

2 Claims, 9 Drawing Sheets

DOCUMENT (BEFORE UPDATE)

DOCUMENT (BEFORE UPDATE)

```
   0
 100
 200
 300
 400
 500   Roe V. Wade, 567 U.S. 100 (1987)
 600
 700   Marbury V. Madison, 2 L.Ed 60 (1803)
 800
 900   Roe V. Wade, Supra.     ⌐ 44
1000
1100   Marbury V. Madison, Supra.   ⌐ 90
1200
1300   Roe V. Wade, Supra.
                                    ⌐ 56        ⌐ 62
1400
2000   567 U.S. 100 (1987)    CR
2100   ID.    CR
2200   Supra.    CR
2300   2 L.Ed 60 (1803)    Cr
```

DOCUMENT (AFTER UPDATE)

FIG. 4

| Group # | Group Element | Offset w/in File | # of Rules | Current String PTR | Rule #1 PTR | Rule #2 PTR | Rule #3 ••• | Rule #N PTR |
|---|---|---|---|---|---|---|---|---|
| 1 | 1 | 500/513 | 3 | 2000 | 2000 | 2100 | 2200 | |
| 1 | 2 | 900/913 | 3 | 2100 | 2000 | 2100 | 2200 | |
| 1 | 3 | 1300/1313 | 3 | 2200 | 2000 | 2100 | 2200 | |
| • | | | | • | | | • | |
| • | | | | | | | | |
| • | | | | • | 78 | 78 | 70 • | 74 |
| 2 | 1 | 1100/1121 | 3 | 2300 | 2300 | 2100 | 2200 | |
| 2 | 2 | 1400/1421 | 3 | 2200 | 2300 | 2100 | 2200 | |

FIG. 3    TABLE 1 (BEFORE UPDATE)

| Group # | Group Element | Offset w/in File | # of Rules | Current String PTR | Rule #1 PTR | Rule #2 PTR | Rule #3 ••• | Rule #N PTR |
|---|---|---|---|---|---|---|---|---|
| 1 | 1 | 500/513 | 3 | 2000 | 2000 | 2100 | 2200 | |
| 1 | 2 | 900/913 | 3 | 2200 | 2000 | 2100 | 2200 | |
| 1 | 3 | 1300/1313 | 3 | 2200 | 2000 | 2100 | 2200 | |
| • | | | | • | | | • | |
| • | | | | | | | | |
| • | | | | • | | | • | |
| 2 | 1 | 1100/1121 | 3 | 2200 | 2300 | 2100 | 2200 | |
| 2 | 2 | 700/721 | 3 | 2300 | 2300 | 2100 | 2200 | |

FIG. 5    TABLE 2 (AFTER UPDATE)

LEGAL CITATION

| RULE # | RULE |
|---|---|
| 1 | 1st Occurrence Within Group (i.e. Smallest Offset) |
| 2 | Next Occurrence. After 1st Occurrence, Checking All Group Elements (i.e. Next Highest Offset > Than Smallest Offset In That Group) |
| 3 | Not 1st Occurrence w/in Group AND Not Next Occurrence After 1st Occurrence, Checking All Group Elements |

# SYSTEM AND METHOD FOR FORMATTING POSITION-SENSITIVE DATA

TECHNICAL FIELD

The invention relates to computerized data processing systems, and, more particularly, to such systems adapted for use in automated formatting.

BACKGROUND OF THE INVENTION

Word processors used on modern day computers have greatly enhanced the efficiency of a document creation. However, today's word processors do not adequately handle position-sensitive data. There are many types of such data, one example being citations in legal briefs which have particularly unique syntactical requirements.

When a court case is properly cited for the first time in a document, the full citation, including the book/page number containing the cited information, is included. If the citation is to be properly referenced again, in accordance with well-accepted rules of legal drafting, the reference would not be the full citation, but rather an abbreviated version. If the second citation is made without any other intervening citations in the document, "Id." is used in lieu of the book/page number. If, on the other hand, the second citation is made after intervening citations in the document, "Supra" is used in lieu of the book/page number.

Modern word processors have the ability to cut and paste data, from one document to another. This provides a person writing an article, paper, etc. a considerable productivity enhancement when they later write similar papers, or want to borrow information from one document when creating another document. However, the well-known cut and paste function is relative "non-intelligent" in that the data to be cut and pasted is merely copied directly, without any consideration being given to any position-sensitive data which may be contained in such cut/paste data. In addition, when a person is editing a document, and decides to cut and paste within the same document, there is no consideration given as to any position-sensitive data.

Accordingly, it is an object of the invention to improve the word processing of document having repeated multiple variants or formatives of data.

It is another object of the invention to provide improved cut and paste operations within word processing systems.

It is still a further object of the invention to facilitate automated formatting of data in word processing systems.

It is yet a further object of the invention to provide a system for automatically detecting and accounting for the editing and updating of position-sensitive data.

These and other objects are achieved by the invention, which may be more fully understood with reference to the accompanying drawings wherein:

BRIEF DESCRIPTION OF THE DRAWINGS

FIG. 3 is a table corresponding to the document of FIG. 2;

FIG. 4 is a document after updating, including offsets corresponding to entries and further illustrating movement of an entry in FIG. 2 to another position within the document;

FIG. 5 is a table corresponding to the document of FIG. 4;

SUMMARY OF THE INVENTION

The entry and editing of position-sensitive data such as character strings is accomplished via a two-phase system. In the first or "definition" phase, position sensitive data, which may be or include words or phrases, is identified. In addition, positional rules for formatting and/or substituting the data (such as text for each word or phrase) are either defined or selected from a pre-existing list. In the second or "edit/update" phase, the document being edited or updated is scanned to locate such position-sensitive data, which may include the words/phrases. The positional relationship between respective words/phrases or other data in a particular group is utilized to determine which rules to apply when modifying the document, in order to automatically reformat or substitute new data such as a new character string.

In a preferred embodiment, when a user enters data such as a text string which will have differing formats dependent upon position within a document, a special control sequence is activated to signal the word processing system that this data is position-sensitive format data (PSFD). Data representations may then be entered for (1) a first appearance of PSFD, (2) a subsequent appearance of PSFD when it immediately follows the first appearance within the document (i.e. without intervening PSFDs), and (3) for a subsequent appearance for the PSFD when such PSFD does not immediately follow the first occurrence of the PSFD. As an example, for a legal citation case (1) hereinbefore noted might be Roe v. Wade, 567 U.S. 100 (1987); case # (2) above, would be Roe v. Wade, Id; and case # (3) above, would be Roe v. Wade, supra.

In accordance with the invention, the system stores such PSFD in a table along with a global/group indicator for the data in general. When it is desired to include a PSFD in a document, the corresponding global/group indicator is selected by conventional means of a special key stroke, menu prompt, or the like. The global/group indicator is embedded in the text at the desired location. When it is then desired to print, display, or otherwise render the document, the system scans the document for such global/group indicators and inserts in their place the appropriate PSFD, dependent upon the relative positional relationship of such PSFD relative to other PSFD's.

Accordingly, a system and method is provided for modifying data in position-sensitive fields in a document, comprising the steps of: scanning the document to detect position-sensitive fields; maintaining a table of position-sensitive field locations; detecting a change in location of any one of the position-sensitive fields with respect to another one of such fields; and modifying at least one of the position-sensitive locations in the table.

DETAILED DESCRIPTION OF THE PREFERRED EMBODIMENT

Figure 1:
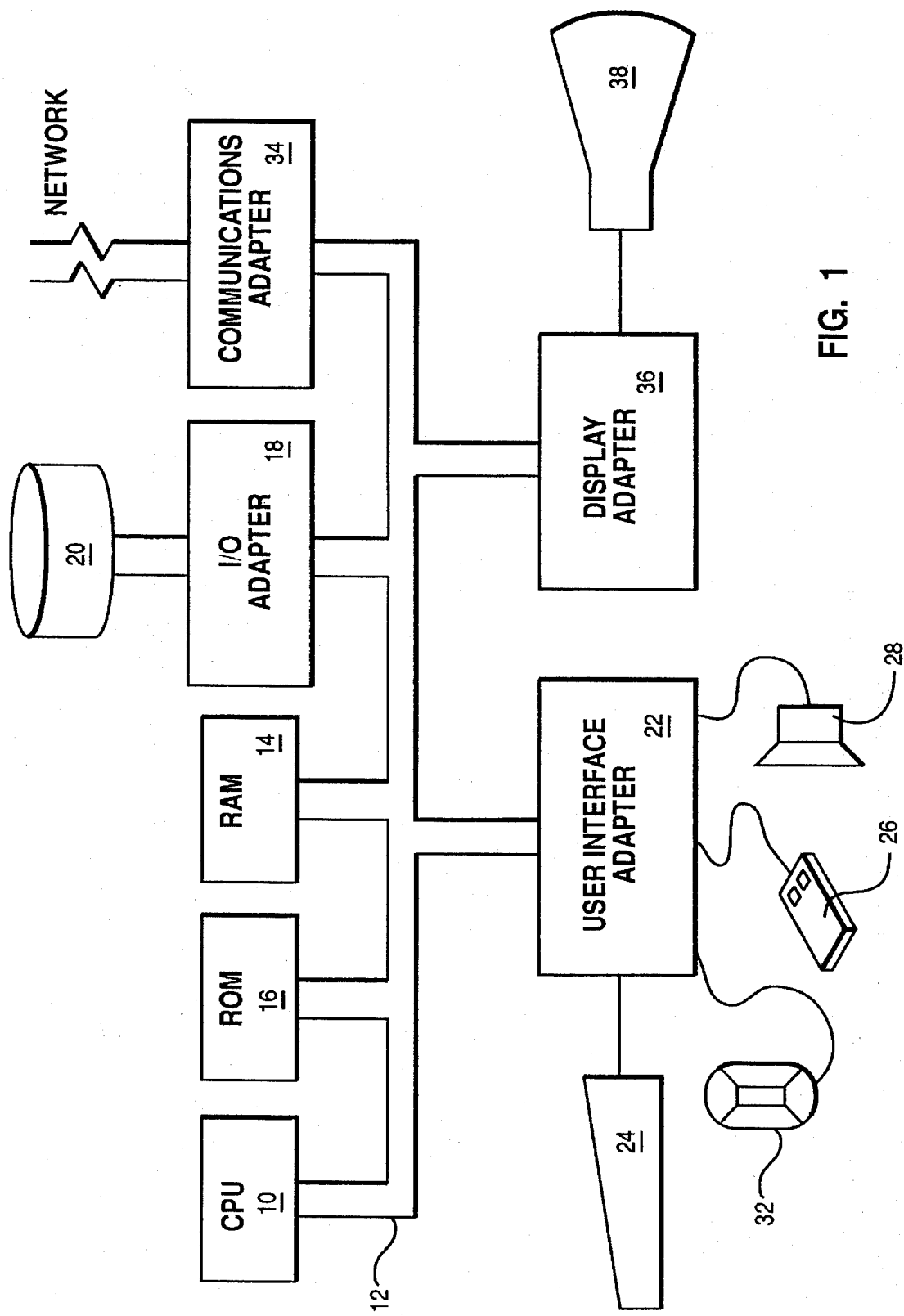
FIG. 1 depicts a representative computerized data processing system.
Figure 7:
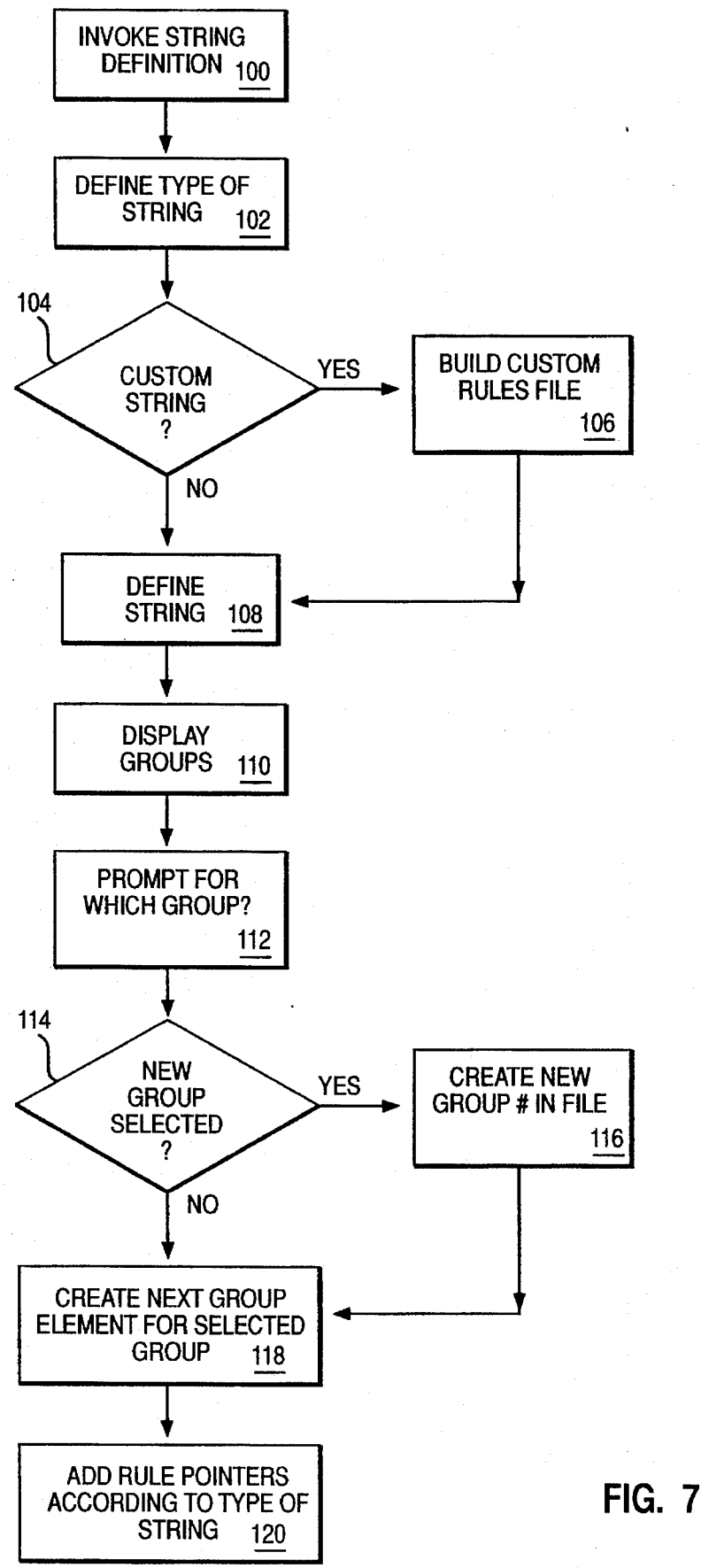
FIG. 7 is a flow diagram of a program operating in conjunction with the system of FIG. 1 implementing phase one of the invention.
Figure 8:
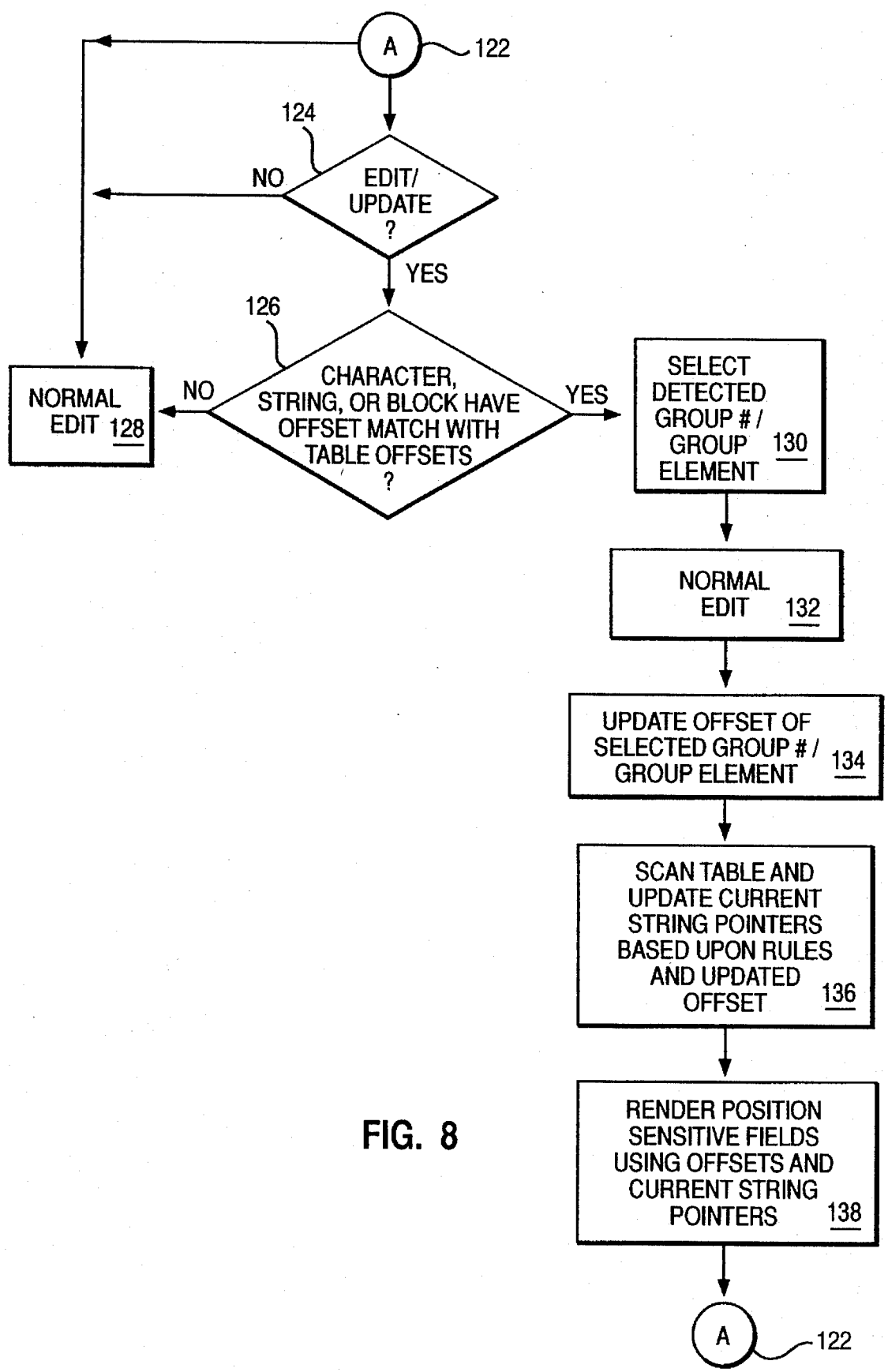
FIG. 8 is a flow diagram of a program operating in conjunction with the system of FIG. 1 implementing phase two of the invention.

FIG. 1 illustrates a preferred embodiment of a computerized data processing system operating in conjunction with the program illustrated in FIGS. 7 and 8 for performing the herein described operations of the invention. The system comprises a CPU 10, read only memory (ROM) 16, random access memory (RAM) 14, I/O adapter 18, user interface adapter 22, communications adapter 34, and display adapter 36, all interconnected via a common address/data/and control path or bus 12. Each of the above components accesses the common bus utilizing conventional techniques known to those of ordinary skill in the art, and includes such methods as dedicating particular address ranges to each component in the system, with the CPU being the busmaster. Other conventional techniques known to those of ordinary skill in the art employed in the system of FIG. 1 include direct memory access (DMA) used to transfer data at high speed from external devices such as DASD 20 or the network shown to the data processing system's RAM As is further shown in FIG. 1, these external devices such as DASD 20 interface to the common bus 12 through respective adapters such as I/O adapter 18. Other external devices, such as the display 38 similarly use their respective adapter such as display adapter 36 to provide data flow between the bus 12 and the display 38 or other device. Various user interface means are provided for interconnection and use with the user interface adapter 22 which, in the figure, has attached thereto representative user input devices such as a joy stick 32, mouse 26, keyboard 24, and speaker 28. Each of these units is well known as such and accordingly will not be described in detail herein.

As will be hereinafter detailed, upon implementation of an appropriate program such as that described herein with reference to FIGS. 7 and 8, the system of FIG. 1 will execute the program in order to effect the automated formatting of position-sensitive data ill accordance with the invention for output on the display 38, on a storage device such as a diskette or DASD 20, a printer interconnected to the user interface adapter 22, or the like.

As will readily be appreciated hereinafter, the invention may appropriately form a portion of a more full featured word processing package implemented in software and intended to execute on a system such as that of FIG. 1. Such a word processing system, in the conventional manner, may provide additional functionality to the user such as automated spell-checking, paragraph indentation, and the like. Inasmuch as the features of the invention are readily applicable to any number of such data and word processing packages, the details of such conventional packages currently available have not been specified herein. The invention is not intended to be limited in any way to any particular such package.

Figure 2:
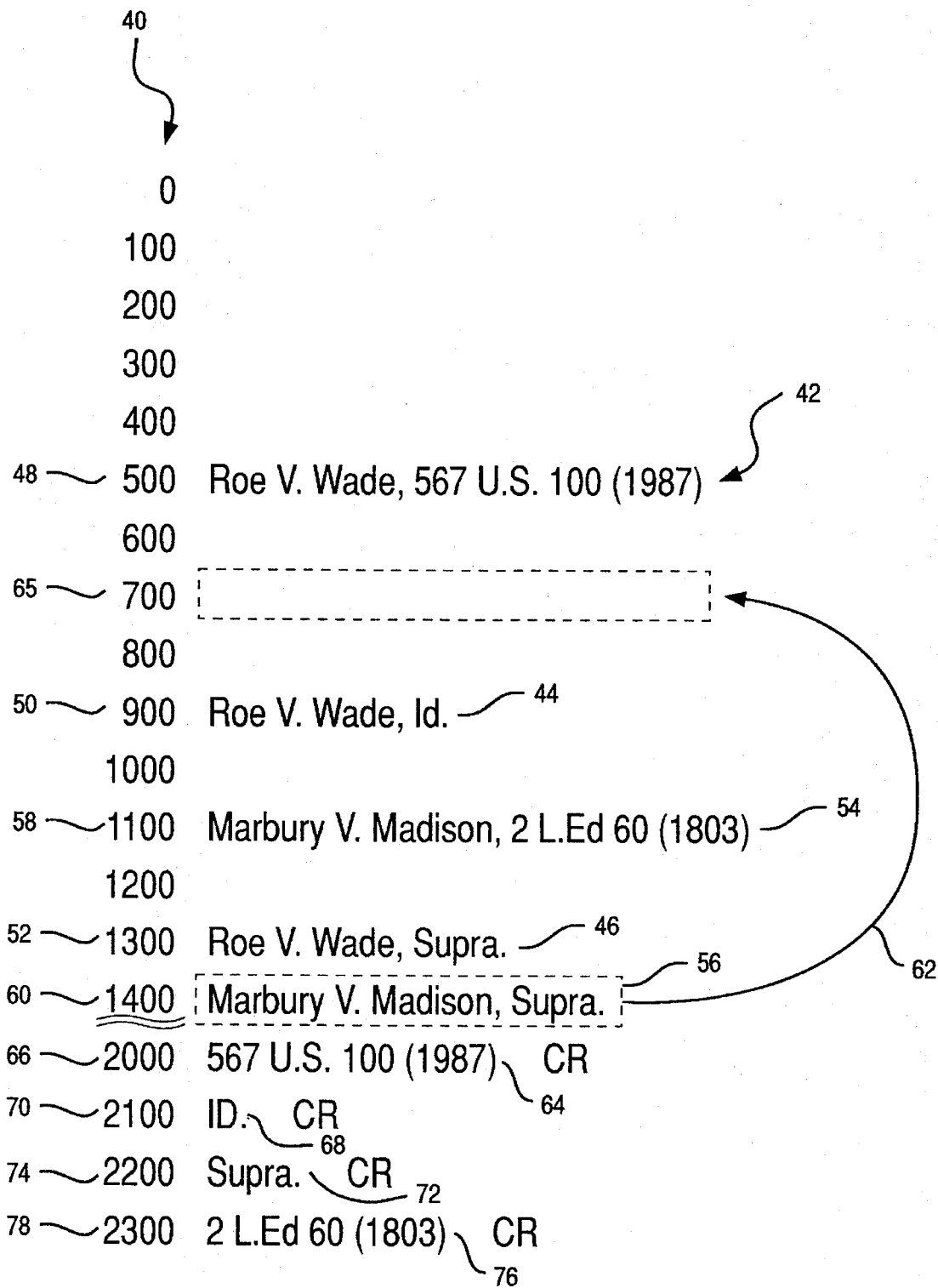
FIG. 2 is an illustration of a document before updating, including offsets corresponding to entries.

Turning now to FIG. 2, a representative page of a document is illustrated which has been input by a user employing the system of FIG. 1 in conjunction with the program herein described. A column of offsets 40 is shown, each such offset being associated with a corresponding field containing user-input text or the like, shown in FIG. 2 immediately to the right of its corresponding offset 40. Inspection of the fields in FIG. 2 will reveal that certain of them include common characteristics so as to be classified into groups. For example, a first group may be comprised of those fields referencing Roe v. Wade, and accordingly would include in this first group, first, second, and third group elements 42, 44, and 46, respectively, having associated therewith, corresponding offsets 48, 50, and 52 at actual offset numbers 500, 900, and 1300.

Similarly, fields referring to another common aspect of text, namely those referring to Marbury v, Madison would form a second group comprised of first and second group elements 54, 56—so grouped because they include the common reference "Marbury v. Madison". These group elements have respective offsets 58, 60, at actual offset numbers 1100, 1400.

As hereinbefore described, instances arise in document preparation wherein a given field or group element may be positionally sensitive, e.g. it may be desirable to display such field in a particular format or variant as a function of its position in the document, such characteristic underlying an important aspect of the invention. Thus, referring in more detail to FIG. 2, a comparison of the group elements 1, 2, 3, (reference numerals 42, 44, and 46) of group 1 in FIG. 2, indicates that while they have the commonality of referencing "Roe v. Wade", each such field has different additional information in it, present because of the relative positioning of the field in the document relative to other elements in the group and group elements of other groups such as that of group 2 (e.g. Marbury v. Madison). It is a feature of the invention, to be hereinafter detailed, that positional rules will be developed governing the formatting of replications of a first occurrence of a field as a function of such relative positioning with the document relative to other group elements.

As an illustration of the foregoing, reference to the second group element in group 1 at reference numeral 44 in comparison to the first group element of group 1 at reference numeral 42 indicates that group element includes the addition of "Id." At the same time it deletes reference to "567 U.S. 100 (1987)" which appears in the first occurrence of the Roe v. Wade citation, e.g. element 1 of group 1, reference numeral 42.

The reason for this has to do with the idiosyncrasies of rules of conventional legal writing, wherein a subsequent citation of a case after a first occurrence thereof without any intervening citations between the first and second citation is properly shown by the case name "Roe v. Wade", followed by "Id." and deleting the case citation such as "567 U.S. 100 (1987)". Because case citations may be extremely long, this shorthand form "Id." essentially incorporates by reference the preceding numerical citation to the case itself while at least informing the reader by a recurrence of the "Roe v. Wade" of the name of the case being cited again. This simply avoids having to carry through, in footnotes, repetitive long citations previously set forth in the document while nevertheless informing the reader at least of the case which was previously referred to.

Continuing with FIG. 2, a comparison of the third element of the first group at reference numeral 46, to the first and second elements 42, 44 reveals yet a different formatting of the case citation for "Roe v. Wade". As in the case of the second group element, 44, the name of the case "Roe v. Wade" is replicated and the numerical citation to the case (e.g. 567 U.S. 100 (1987)) omitted. However, in place of the "Id.", the term "Supra" is substituted, this term again having to do with idiosyncratic formatting rules associated with legal drafting.

In such a case, it is in accord with conventionally accepted legal drafting style that when a subsequent citation of a case is required which previously occurred in a document, the previous occurrence of the numerical citation to the case may be incorporated by reference as indicated by the term "Supra" As in the case of the second element, 44, at least the name of the case is nevertheless replicated to again remind the reader of the name of the case being referred to, without carrying the excess baggage of the sometimes lengthy numerical case citation.

However, comparison of the second and third group elements 44, 46, of the first "Roe v. Wade" group suggests there is a reason for use of the "Supra" term in the third group, 46, rather than the term "Id." in the second group, 44. In fact, again in keeping with accepted legal drafting principles, the reason or "rule" for use of the "Supra" term is that in instances when a subsequent citation is to a previously occurring citation which has an intervening citation to another case therebetween from another group, the term "Supra" is employed rather than "Id."

Thus it may be seen that between the first occurrence of the "Roe v. Wade" citation (e.g. the first group element of the "Roe v. Wade" group 1, shown at reference numeral 42) and the occurrence of the third group element of group 1, shown at reference numeral there occurs therebetween a reference to a citation from a different case, comprising the second group (e.g. "Marbury v. Madison", shown as the first element of the second group at reference numeral 54).

Thus, in summary, the "Supra" occurs in the third group element of group 1 at 46, referring to the first group element of group 1 at 42 because of the intervening citation to a different case name and group (e.g. "Marbury v. Madison" at 54). Term "Id." is used in the second group element of the "Roe v. Wade" group 1, at 44 because there is no intervening citation from another different case name or group between the first group citations 2 and 4.

In contrast, and in summary, interposed between the first and second occurrences of citations to the second group "Marbury v. Madison", 54, 56, is a citation 46 to a different case, e.g. the first group "Roe v. Wade". Consequently, the term "Supra" appears in the second occurrence of the Marbury v. Madison citation at 56, thereby indicating that the Marbury case was previously cited but that the reader will have to skip over citations to other cases in order to eventually arrive at the appropriate numerical citation to the Marbury v. Madison case.

From the foregoing it will be apparent that various rules may be formulated for determining, for a given case name such as "Roe v. Wade", whether to follow it with the full numerical citation to the case "567 U.S. 100 (1987)", or with a "Id." or a "Supra" as a function of the appearance of the desired citation relative to preceding citations to the same case.

For illustrative purposes, an example of the invention has been described relative to rules corresponding to proper citation of legal cases. However, it should be readily apparent that the invention is not intended to be so limited, but rather admits to application to essentially any form of data which is positionally sensitive. In other words, the invention is applicable to other data which also lends itself to rules defining which formative of the data should appear as a function of its relative position within a document. Accordingly, in a generic sense, the "data" referred to herein may be in any form and correspond to any desired set of positional rules defined by the particular application and data involved. After editing in accordance with the invention, a citation such as citation 56 at offset 60 will be relocated as shown by arrow 62 to a new offset location 65. It will be readily apparent, given the foregoing rules, that such relocation during an editing process of the document will require changing of the citations because of their positionally sensitive nature.

Continuing with FIG. 2, it will be noted that the portions of a given citation which are position sensitive may further be separated out and stored at corresponding offsets. For example, the numerical case citation "567 U.S. 100 (1987)" shown at field 42, offset 500, may be stored at field 66, offset 2000. The "Id." 44 in field 50 may be stored at field 70, offset 2100. Similarly "Supra" 46 in field 52 may be stored at field 74 in offset 2200 and "2 L.Ed 60 (1803)" shown in field 58 stored at offset 2300 in field 78.

The purpose for so doing will become more clear with reference to the description which hereinafter follows. However, for present purposes, it will suffice to know that given the formulation of the foregoing positional rules, it is a feature of the invention that upon invocation of a given rule in an automated fashion with the system of the invention, the system will determine that in a given position in the document, a different respective one of the position-sensitive portions of the citation (such as those just described at 68, 72, and 76) should be substituted or added in accordance with the respective rule. Thus, when a rule is invoked, automated implementation thereof will simply invoke a pointer to the corresponding offset at fields such as 66, 70, 74, or 78, such that this positionally sensitive portion of the data may be inserted and substituted at the appropriate place in the document, thereby effecting the automated position-sensitive formatting as taught herein.

Turning now to FIG. 3, an illustration is provided in tabular form (adapted to be stored within the memory of the system of FIG. 1) of various data in columns and rows associated with the document such as that of FIG. 2 prior to its being edited.

Discussing the column designations of FIG. 3 first, as they apply to a given row of data, the first column "Group #" indicates the group to which a given "Group Element" identified in the second column belongs. The numbered "Group Element" is an entire given citation having an element common to other group elements within the group. Thus, group elements 1, 2, and 3 from group 1 (shown at reference numerals 42, 44, 46) all have in common (referring back to FIG. 2) the case name "Roe v. Wade" and it is this common case name which appears in all citations which determines that all of the group elements 42, 44, 46, belong to group 1.

The next column "Offset Within File" refers to a range of offsets or locations within a given file and memory (such as the offsets 40 in FIG. 2) wherein the data corresponding to e given group element may be found. Thus, for example, continuing with the example of group element 1 in FIG. 3, this group element corresponds to "Roe v. Wade", 567 U.S. 100 (1987)". The ASCII values for this string may be located in memory in the file corresponding to the document of FIG. 2 in the memory address range between location 500 through 513. (500 is the offset for the common case name (i.e. fixed portion), 513 is the offset for the PSFD (i.e. variable portion)).

The next column of FIG. 3 "# of Rules" indicates the potential number of rules which the given group element may be subject in order to determine its particular format in a given location within the document. As previously described, in the case of legal citations under discussion, there are three possible applicable rules which will very the formatting of a citation, namely (1) a first rule corresponding to a first occurrence of a citation, (2) a second rule in which the "Id." will be utilized if there are no intervening citations between the citation including the "Id." and the original occurrence of the citation, and finally, (3) a third rule dictating usage of the "Supra" when a non-first occurrence of a citation is desired but there is an intervening citation from another case between the first occurrence of the citation without the "Supra" and the subsequent citation including the "Supra". It will be appreciated that for a given group, the number of applicable rules may vary according to the particular application and the invention is not intended to be limited to only three such rules.

Continuing with the illustration of FIG. 3, the next column "Current String Pointer" (abbreviated PTR) is a conventional software pointer to the offset where the positionally sensitive portion of the citation of the given group element may be found. Taking the first group element as an example, the entire citation to this group element 1 from group 1, as previously described, may be found at offset location 500 shown in FIG. 2. However, the portion which is position-sensitive, e.g. "567 U.S. 100 (1987)" shown at reference numeral 42 of FIG. 2 will be located at offset location 513 by employing the "current string pointer", reference numeral 66 of FIG. 3, which points to offset 2000 in FIG. 2. At this offset 2000, the string of the portion of the citation corresponding to group 1, group element 1, which varies as a function of position within the document may be located, e.g. "567 U.S. 100 (1987)" Note that the CR indicates the end of the position-sensitive string.

Continuing with the example of FIG. 3 and the first row, the next column is designated "Rule #1 Pointer". This contains an offset at reference numeral 66 pointing to the location in the document in FIG. 2 where the form of the variable portion of the citation of group 1, group element 1 appears if that variable portion of the citation has been subjected to Rule 1. In this case, the pointer is to offset 2000 which is identical to the "Current String Pointer" offset of 2000 in the preceding column, the reason being that this first group element of group 1, given its position in FIG. 2, must comply with this Rule #1 since it is a first occurrence of the citation.

The next column "Rule #2 Pointer" points to an offset location corresponding to the document in FIG. 2 where the proper variable portion of the citation corresponding to a given group element of a group will appear if that group element is in such a position in the document so as to be required to conform to Rule #2. Thus, if the citation corresponding to group element #1 of group 1 were to be moved so as to occur next to a first occurrence of the citation without any intervening citations, when so moved this position-sensitive variable portion of the prior group element 1, group 1 citation would thus be required to conform to Rule #2. The particular form of this variable portion of the citation may thus be found by searching for the entry beginning at the offset "2100", shown as reference numeral 70 in the "Rule #2 Pointer" column and in the first row. Thus, referring back to FIG. 2, if the group 1, group element 1 citation shown at reference numeral 42 were to be moved to a location such that, given its new position, it was required to conform to Rule #2 (e.g. it was a subsequent occurrence of a citation immediately following a first occurrence of the citation without any intervening citation), this group 1, group element 1 citation (after being newly moved) would be required to conform to its form as shown by the Rule #2 Pointer to that entry appearing at the offset "2100", namely "Id." In a manner which will be hereinafter described, this would automatically transform the citation shown at offset 500 in FIG. 2 to that shown at offset 900 in FIG. 2, namely the variable portion "567 U.S. 100 (1987)" would be deleted, and the "Id." found at offset 2100 would be substituted after the case name, as shown at offset 900.

These columns corresponding to pointers to forms of the variable portions of the citations which vary as a function of their position within the document may be continued as desired for the number of columns necessary to correspond to the number of rules to which group elements of a given group must comply. Thus, the columns have been extended in FIG. 3 to the generic case to an arbitrary number of "N" rules and corresponding pointers, as shown at reference numeral 80.

The rationale for the data entries in the various columns relative to row 1 in FIG. 3 will be carried out for subsequent rows corresponding to the additional group elements in a given document. Thus, taking the second row of FIG. 3 as yet an additional example, the next group element "2" (shown at reference numeral 44 in FIG. 2) is made an entry in the group element column. Such group element corresponds to group 1 as shown in the first column because of the commonality of the identical case name "Roe v. Wade" with the group element entry in the row immediately above this second row. In the third column of this second row, the offset range 900–913 is shown at reference numeral 50 corresponding to the offset location in FIG. 2 wherein the citation corresponding to this group element appears. As with the prior row, 900 is the offset for the common case name and 913 is the offset for the PSFD. In like manner to group 1, group element 1, this group element 2 of group 1 (as with all other elements in the group) conforms to one of the predetermined 3 rules previously described, thus explaining of the "3" in the "#of Rules" column in the second row.

In the "Current String Pointer" column in the second row of FIG. 3, the offset "2100" appears pointing to the location where this group 1, group element 2 citation first appears prior to any editing or alteration. As in the case of the other group elements for group 1, location of the variable portions of the citation of group 1 as a function of whether this variable portion is (due to its position in the document) having to conform to Rule #1, Rule #2, or Rule #3, is shown at respective offset locations 2000, 2100, 2200, in the last 3 columns of FIG. 3, second row (e.g. reference numerals 66, 70, and 74). Thus, for example, if group 1, group element 2 in the second row of FIG. 3 (reference 44, FIGS. 2 and 3) were to be relocated to a portion where the variable portion must correspond to Rule #2, the form of this variable portion when conforming to Rule #2 would thereby be found by means of the lookup table in FIG. 3—e.g. the formative of the variable portion of the citation conforming to Rule #2 could be found by retrieving the entry at offset 2100, shown at reference numeral 70, second row, column designed "Rule #2 Pointer"

Looking further down in the table of FIG. 3, for the sake of completeness, 2 rows corresponding to the group #2 with their associated data entries have been shown. It will be recalled that group #2 is so designated because the citation refers to a different case name, e.g. "Marbury v. Madison". Referring back to FIG. 2, the first occurrence of a "Marbury v. Madison" citation, shown at offset 1100 in reference number 54, is thus designated group element 1 of group 2, as shown in the 4th row of data in FIG. 3. Similarly, the offset range 1100–1121 reflects the location in memory where this complete first citation of the "Marbury v. Madison" case (reference numeral 54, FIG. 2) appears. Again, the 1100 is the common case name offset and 1121 is the PSFD offset.

Because we are still dealing with rules of legal writing relative to group 2, the citations of group 2 are also subject to the same rules as that of group 1. Thus, in the rows corresponding to group 2 elements in FIG. 3, in the "#of Rules" column a "3" appears, indicating that each group element of Group 2, in like manner to those for group 1, are subject to the same 3 rules.

In the next "Current String Pointer" column, a 2300 appears for the first row or first group element of group 2, thus pointing to the location in FIG. 2 where the position-sensitive variable portion of the citation 54 at offset 1100 in FIG. 2 is stored, e.g. the portion "2 L.Ed 60 (1803)". As long as this first full citation shown at reference numeral 54 in FIG. 2 occurs within the document as a first citation, the variable portion of the citation must conform to Rule #1. Thus, in the "Rule #1 Pointer" column and the first group 2 row corresponding to this group element 1, the number "2300" appears. Referring to FIG. 2, it will be seen that this variable portion of the citation at offset 2300 (reference numeral 78) conforms to the form shown at reference numeral 54, offset 1100. This is because, of course, the citation at reference numeral 54 is in fact a first occurrence of the citation in the document shown in FIG. 2.

Similarly, if this group 2, group element 1 citation 54 in FIG. 2 were to appear at a different position within the document, dictating that the variable portion thereof conformed to Rule #2, the variable portion may be found at the 2100 offset location in the "Rule #2 Pointer" column and the row of group 2, group element 1. Similarly, if this citation of group 2, group element 1 were to appear at a location dictating that the variable portion thereof conformed to Rule #3, the correct appropriate new portion of this variable, position-sensitive component of the citation may be found by employing the lookup table of FIG. 3 and examining the contents corresponding to the offset 2200 (shown by the table in FIG. 3 as the intersection of the column "Rule #3 Pointer" and the group 2, group element 1 row).

It will be recalled that this Rule #3 states that if a particular group element of a group is a citation appearing after a first occurrence wherein there is an intervening citation to another case, the appropriate subsequent citation should be the case name, followed by "Supra". At offset 1400, such a citation 56 is shown therein which occurs after the first occurrence of the citation shown at offset 1100, the "Supra" appearing in the citation 56 because of the intervening "Roe v. Wade supra" appearing at offset 1300. It will be noted that this group 2, group element 2 variable portion of the citation 56 at offset 1400 in FIG. 2, e.g. the "Supra", appears at offset 2200 which was correctly pointed to in the table of FIG. 3 (as shown by the intersection of the Rule #3 Pointer" column and the group 2, group element 2 row).

Referring now to FIG. 4, depicted therein is a pictorial illustration of the document of FIG. 2 after an edit is performed. It can be seen that the user, upon viewing the document of FIG. 2 on the display 38 of FIG. 1, has desired to transfer the citation 56 appearing at offset 1400 in FIG. 2 to the location corresponding to offset 700, as shown by the arrow 62. This citation 56 in FIG. 2, it will be noted, was a second occurrence of "Marbury v. Madison" citation (the first occurrence thereof being citation 54 at offset 1100). Accordingly, the second such occurrence of a "Marbury v. Madison" citation at reference 56 includes the "Supra" designation, indicating that an intervening citation to another case (Roe v. Wade) has been disposed between the first occurrence of the Marbury v. Madison citation (reference numeral 54) and the citation 56 at offset 1400 in FIG. 2 under discussion (which has been moved to offset 700 as shown in FIG. 4).

Because this second occurrence of the Marbury v. Madison citation, 56, after the move, has now become a first occurrence of a Marbury v. Madison citation at offset 700 shown in FIG. 4, the "Supra" appearing in citation 56 is thus no longer appropriate, and the entire numerical case citation must be substituted therefor in accordance with Rule #1 as shown at offset 700 in FIG. 7. Moreover, because the original first occurrence of the Marbury v. Madison citation at offset 1100, FIG. 2, has now become a second occurrence of a citation to such case, the numerical citation "2 L.Ed 60 (1803)" appearing in the citation 54 of FIG. 2 is no longer proper because the latter variable portion of the citation must now be changed to conform to either Rule #2 or Rule #3.

Determination of which Rule #2 or #3 applies, in accordance with the rules, is accordingly to be determined dependent upon whether there are any intervening citations to other cases between the first occurrence of a Marbury v. Madison citation at offset 700 and the subsequent occurrence at offset 1100 (FIG. 4). Because there is now, in fact, an intervening citation to a different case (e.g. "Roe v. Wade" offset 900), Rule #3 is applicable to the second occurrence of a Marbury v. Madison citation appearing at offset 1100. Thus, comparison of the citation at offset 1100 in FIG. 4 to that of the citation at offset 1100 of FIG. 2 indicates that the variable portion "2 L.Ed 60 (1803)" has been deleted and the now proper "Supra" designation takes its place (indicating the case was previously cited but there was an intervening citation, (e.g. at offset 900)).

Referring now to FIG. 5, a table is shown similar to that of FIG. 3 but indicating in the various rows and columns data corresponding to the document of FIG. 4 after the previously described relocation of cite 56 from offset 1400 to offset 700.

Referring more particularly to FIG. 5 in comparison with FIG. 3, several changes will be noted which were caused by the editing process reflected in the updated document of FIG. 4, such changes being shown at reference numerals 92, 94, 96, and 98 in FIG. 5. First, the most obvious and intuitive change is that because the citation corresponding to group 2, group element 2 has been relocated from offset 1400 to offset 1700, the new offset values have been reflected in FIG. 5 at reference numeral 98 as offset 700/721. Secondly, because, after the edit, group element 2 of group 1 has now become the first occurring citation of Marbury v. Madison and group element 1 of group 2 has become the second occurrence of such citation, it is not surprising that the corresponding entries for group 2, group element 1 and group 2, group element 2 have been transposed in the "Current String Pointer" column in that the citations have effectively changed places.

Because it is a feature of the invention that the particular format of data is position-sensitive, by such a transposition of the group 2, group element 2 citation from a location preceding the group 2, group element 1 citation (prior to editing) to a position where it precedes the group 2, group element 1 citation, the current string pointers 94, 96 shown in FIG. 5 will change relative to their prior corresponding pointers 78, 74, shown in FIG. 3.

More particularly, because the group 2, group element 2 citation is now the first occurring citation, the variable portion which should appear in such a first citation occurrence (namely "L.Ed 60 (1803)") is now pointed to as shown by the "current string pointer" 96 pointing to offset 2300. Previously, when this group 2, group element 2 citation was not a first occurrence, it will be noted from FIG. 3 (prior to the edit) that this pointer 74 was to the variable portion of the string shown at offset 2200 (e.g. "Supra"), reflecting that previously there was a first occurrence of a Marbury v. Madison citation in the from of the group 2, group element 1 citation.

In like manner, with reference to group 2, group element 1, now that the citation corresponding thereto is no longer a first occurrence but rather a second occurrence after the edit and the move of the group 2, group element 2 citation, the variable portion of the group 2, group element 1 citation is now subject to either Rule #2 or Rule #3 in that it is a subsequent occurrence of the citation.

Again, which rule applies is a function of the relative position of the group 2, group element 1 data in the document relative to other group elements. More specifically, inspection of FIG. 4 reveals that this group 2, group element 1 citation at offset 1100 now has an intervening citation 50 at offset 900 referring to a different case (Roe v. Wade) between the Marbury v. Madison 90 at offset 1100 and the first occurrence of the Marbury v. Madison citation at reference numeral 700. The intervening citation gives rise to invocation of the third rule as shown by the pointer 94 pointing to offset 2200 at the intersection of the "Current String Pointer" column and the group 2, group element 1 row.

Thus, it may be seen in FIG. 4, in comparison to FIG. 2, that the "2 L.Ed 60 (1803)" variable portion of the citation at offset 1121 in FIG. 2 has been deleted (which was at pointer offset 2300) and, now, as shown in FIG. 4, the term "Supra" has been substituted therefor (shown at reference numeral 90 in offset 1100), this term being pointed to by the current string pointer 94 to location 2200 in FIG. 5.

Continuing with reference to FIG. 5, it will be noted that the current string pointer 92 corresponding to group 1, group element 2 (which pointed to offset 2200 originally prior to the edit) was a pointer to offset 100 in FIG. 3 (shown at the intersection of the "current string pointer" and the group 1, group element 2 row). Comparison of the corresponding illustrations of the documents before updating, FIG. 2, and after updating, FIG. 4, will reveal why this current string pointer relative to group 1, group element 2 has thus changed.

Referring back to FIG. 2, prior to the edit and move shown by arrow 62, the group 1, group element 2 citation appearing at offset 900 included an "Id." variable portion thereof, shown at citation 44. It will be recalled that the reason for this was that Rule #2 was invoked inasmuch as this citation 44 was a second occurrence of the "Roe v. Wade" citation and was immediately preceded by the first occurrence of such a Roe v. Wade citation 48 at offset 500. Thus, in the table of FIG. 3, the current string pointer shown at the intersection of the current string pointer column and the group 1, group 2 element row was to the "Id." appearing at offset 2100. This, in turn, reflected that the second rule was invoked for the variable portions of citations, namely a subsequent occurring citation with no intervening citation between the first Roe v. Wade citation at offset 500 and the subsequent one at offset 900 (FIG. 2).

However, after editing, as shown by the arrow 62 in FIG. 4, as a result of the move of Marbury v. Madison citation from offset 1400 to offset 700, an intervening citation thus now occurs between the first Roe v. Wade citation 500 and the subsequent Roe v. Wade citation corresponding to group 1, group element 2, shown at offset 900. Thus, a comparison of the Roe v. Wade citations at offset 900 in FIG. 2 and FIG. 4 reveals that the variable portion thereof has changed from "Id." to "Supra". This means that the third rule has thereby been invoked relative to the citation 44 at offset 900 (FIG. 4) because of this new intervening Marbury v. Madison citation now interposed between Roe v. Wade citations at offset 500 and 900. This fact has accordingly been reflected in the table of FIG. 5.

More particularly, the current string pointer to offset 2100 in FIG. 3 (the intersection of the current string pointer column and the group 1, group 2 element row which invoked the "Id.") has been changed as shown in FIG. 5 at the pointer 92 to now point to offset 2200, corresponding to the "Supra", now appearing at offset 900 in FIG. 4).

Figures 6, 13:
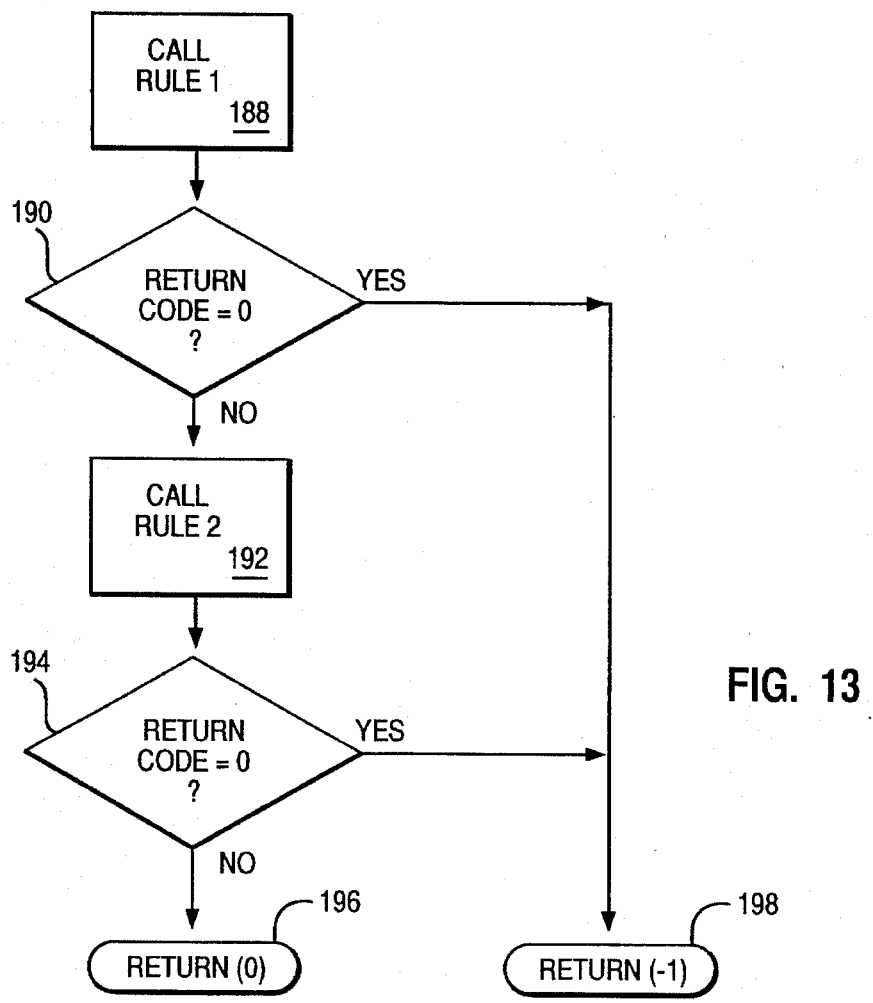
FIG. 6 is a representative illustration of a positional rule set.
FIG. 13 is a flow diagram of a program implementing Rule #3.

Referring now to FIG. 6, an illustrative table articulating the hereinbefore described rule numbers and the corresponding rules is shown. It will be readily apparent that such rules may be implemented in a macro or lookup table in a computer program as part of the program implemented with the flow diagram of FIGS. 7 and 8 to be executed on the system of FIG. 1. Corresponding to each rule will be a formatting requirement dictated by invocation of the particular rule when the conditions thereof are met. For example, it will be recalled that Rule #1 (wherein data is a first occurrence of a group element within a group) dictates provision of a complete citation including the numerical citation to the case. Such a complete citation may be seen at reference numeral 42 and 54 in FIG. 2.

Similarly, if it is determined from the system of FIG. 1 operating the program described herein that given data positionally complies with the constraints of Rule #2 (e.g. the data is not a first occurrence but rather positionally a next occurrence of a citation without an intervening citation), then the variable portion of the citation resulting from invocation of this Rule #2 will be placement of the "Id." in the citation. In like manner, invocation of Rule #3 (not a first occurrence of a citation with a group and not an immediately next occurring citation after checking all of the group elements, which is to say that there is an intervening citation), this will in turn result in the variable portion of the citation occurring as "Supra".

From the foregoing, it will be appreciated that the preceding process may be automated by an appropriate program executing on the system of FIG. 1. In a first phase, during text entry, when a user desires to enter a position-sensitive data point, the user, in a preferred embodiment, would invoke a menu or other selection technique utilizing traditional functions such as a predetermined function key, particular key stroke sequence, or the like. The user would thus initiate invocation of phase 1 processing. In this phase the user would define the particular position-sensitive data as well as the type of text and associated Rules for subsequent data modification in accordance with the table shown in FIG. 3, for example, whereby he/she would essentially build the table. This process will be hereinafter described in more detail with reference to FIG. 7.

Subsequently, when the user desires to modify data (which of course corresponds to editing a document for example) wherein the data being modified is either being changed or relocated within the document (or other data is being added or deleted) a second edit/update phase 2 may thereafter be invoked with the system of FIG. 1 operating in conjunction with a program implemented in accordance with the flow diagram of FIG. 8. The document being thus edited or updated would accordingly be automatically scanned under control of the system to locate the positionally sensitive words, phrases or other data earmarked as a result of execution of the first phase. The positional relationship between respective words and/or phrases in a particular group will thereafter be employed to determined which rules apply, when modifying the text, in order to automatically reformat or substitute a new character string as hereinbefore described.

Turning now to FIG. 7, a more detailed description of the first phase will now be provided.

First, when a user is inputting a document with the system of FIG. 1 and an instance arises wherein the user contemplates the particular data about to be entered may desirably be positionally sensitized, he or she may invoke a string definition utilizing the user interface of the system of FIG. 1 as shown at reference numeral 100 in FIG. 7. The user may then be prompted by the user interface to define the type of string about to be input, shown at reference numeral 102, e.g. whether or not the string is going to comprise a group of strings whose formatting will be determined by its position in the document and a customized set of rules. This decision is indicated at box 104. If a custom set of string formatting rules is anticipated, the user will be then prompted to construct an appropriate custom rules file such as that shown with reference to FIG. 6 indicated at reference numeral 106 of FIG. 7. On the other hand, if a predetermined rule set is to be employed (such as that previously built during a prior edit process or 'built' by a software house and supplied with the word-processor), the "no" path is exited at box 104.

The user then may proceed to define the particular string to be input, 108, whereupon the user interface would display the list, 110, of the various groups of strings associated with the document being edited. The user would then be prompted to indicate which group is appropriate for the particular string to find at block 108, shown at reference numeral 112. The system would then determine if this group specified at block 112 is a new group, shown at decision block 114. If the system detects that the defined group input, in response to the prompt at 112, is in fact a new group, the "yes" path is exited from block 114 to block 116.

In block 116, the user will thence be prompted to create and store a new group number in the file associated with the document. In contrast, if the system determines that the group prompted for an input by the user at block 112 is not a new group, the "no" path is exited from the decision block 114. In either event (e.g. whether the group specified is a pre-existing group or a newly created one), block 118 is thereafter entered, whereupon the user is prompted to create a group element for the selected group (such as the various rows in FIGS. 2 and 4). After doing so, the user is then prompted at block 120 to add the rule pointers such as those shown in FIGS. 3 and 5 for each such group element according to the type of string associated with the particular group element.

Turning now to FIG. 8, a more detailed description will be provided of the flow diagram from which may be implemented an appropriate program to execute on the system of FIG. 1 providing the functionality hereinbefore described relative to phase 2. The routine is entered at point A shown at reference numeral 122, whereupon the user is queried through an appropriate user interface shown at the decision block 124 as to whether the user desired to simply edit the particular document in the normal fashion or to update it in accordance with the features of the invention whereby position-sensitive formatting is effected.

If in response to the query 124, normal editing is desired, the process exits to block 128 whereupon normal editing functions associated with word processors and the like is effected. If updating in accordance with the invention is desired, the decisional block 126 is entered by the processing executing on the system. At this point, a character, string, or block identified to be updated is checked in the program by comparison to the software tables (implemented as described with reference to FIG. 7 and corresponding to those of FIGS. 3 or 5, for example) to determine whether the character, string, or block which is desired to be updated has a corresponding offset matching with offsets appearing in the table thus constructed. If no such offset is detected, this indicates that the process cannot provide the automated formatting features of the invention, and thus block 126 is exited along the "no" path, whereupon normally editing is resumed, 128.

If, on the other hand, (in response to the automated query at block 126) an offset match is indicated between selected characters, strings, or blocks with those having offsets present in the previously described tables, the software implementation of block 130 thereafter transpires selecting a group element from a group number having an offset matching that of the character, string, or block under consideration (shown at reference numeral 130). The group element thus selected in block 130 is thereafter edited, 132, whereupon after such editing, the offset of the selected group element of a particular group number is updated (shown at reference numeral 134).

It will be recalled that this corresponds in the example set forth previously to, for example, the change in offset of the group 2, group element 2 entry in FIG. 3 from the offset appearing in the "Offset Within File" of 1400/1421 to the new offset 700/721 appearing in FIG. 5 (reflecting movement of the "Marbury v. Madison" shown in FIG. 4 by the arrow 62).

Continuing with FIG. 8, upon updating in the appropriate table of the offset, shown at block 134, in response to the edit 132 the process executes the function described at block 136. Specifically, the table previously built is thereafter automatically scanned. The current string pointers (such as those shown in the "Current String Pointer" column of FIG. 5) are then updated based upon the rules of FIG. 6 (offsets of which were provided in the building of the table and shown in the various rule pointer columns of FIG. 5 in the table). This process is shown in detail in FIGS. 9–13.

Figure 9:
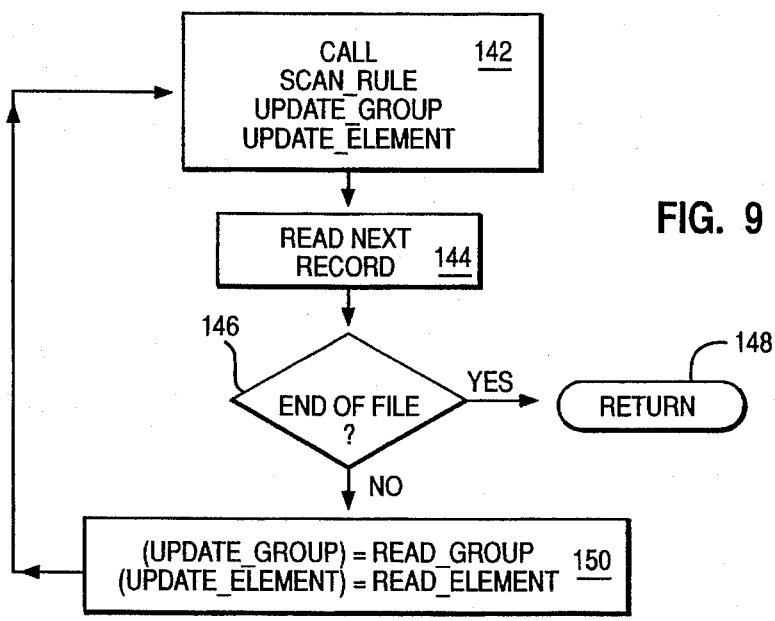
FIG. 9 is a flow diagram for a program implementing a scan of the tables in FIGS. 3 and 5.

FIG. 9 is a representative flow diagram of a program which will effect the scanning of the tables in the manner previously described. This routine will update edited strings on a first pass, and will update all other table entries on a second pass. A function call Scan Rule is first invoked at box 142 to scan the elements of a group. A record in the table corresponding to a given group and group element is next read, whereupon the subroutine queries whether the end of file has been reached, 146. If so, exiting to the right of block 146 indicates the routine has completed whereupon the function provides a return 148 to the main program.

If, on the other hand, the end of file has not been reached, shown by exit from the bottom of block 146, the group and element just read are set, respectively, to the update group and update element in block 150, whereupon the process loops back to the beginning of the scan routine, 142. The looping continues until all of the groups and elements have been scanned, whereupon the return, 148 is provided.

Figure 10:
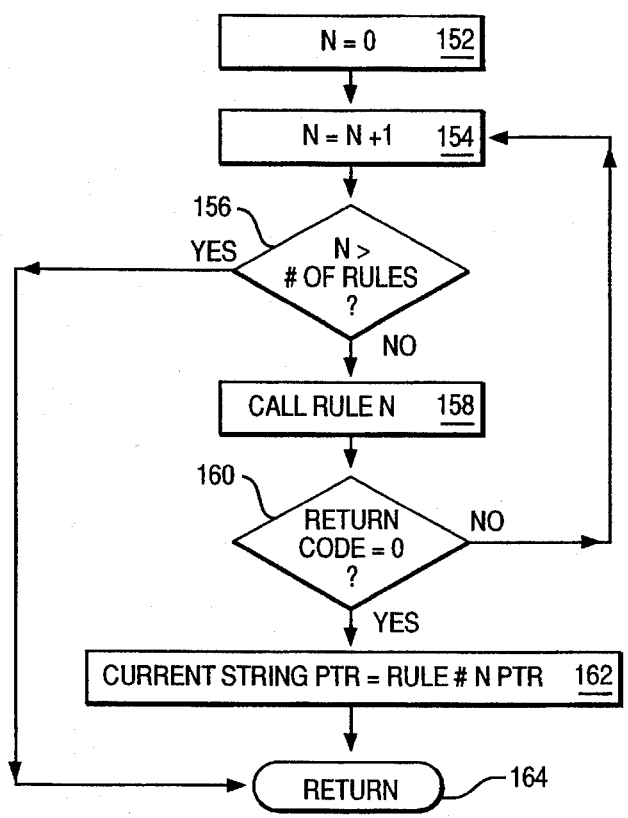
FIG. 10 is a flow diagram of a program implementing a scan of Rule #1 through Rule #3.

Turning now to FIG. 10, this flow diagram illustrates the Scan-Rule subprogram or subroutine executed by the system of FIG. 1 for effecting the scanning of the tables for all of the rules. First, a loop counter is implemented in the conventional fashion by setting N=0, block 152 and then incrementing N each time through the loop, shown by N=N+1, at block 154. A test is made each time through the loop, block 156, to determine if N has exceed the number of rules being scanned for a group. If not, exiting block 156 in the downward direction causes a function call to rule N, block 158, whereupon code associated with implementing the respective rule is executed (shown in FIGS. 11–13).

Figure 11:
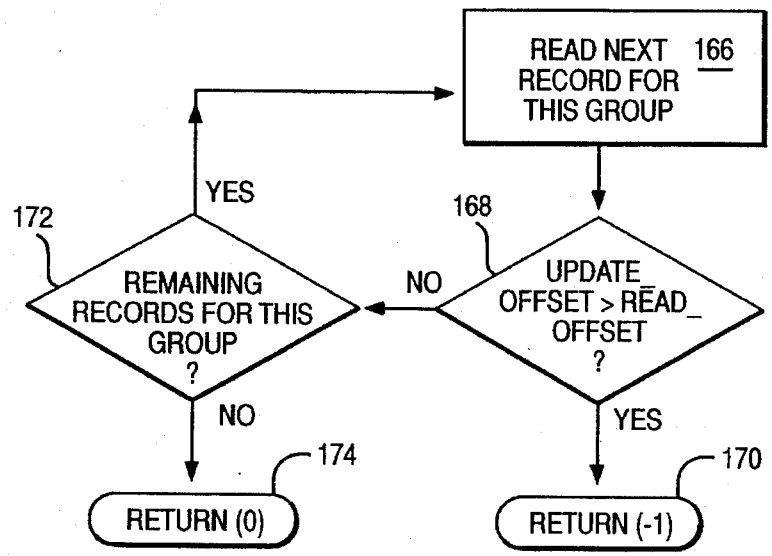
FIG. 11 is a flow diagram of a program implementing Rule #1.
Figure 12:
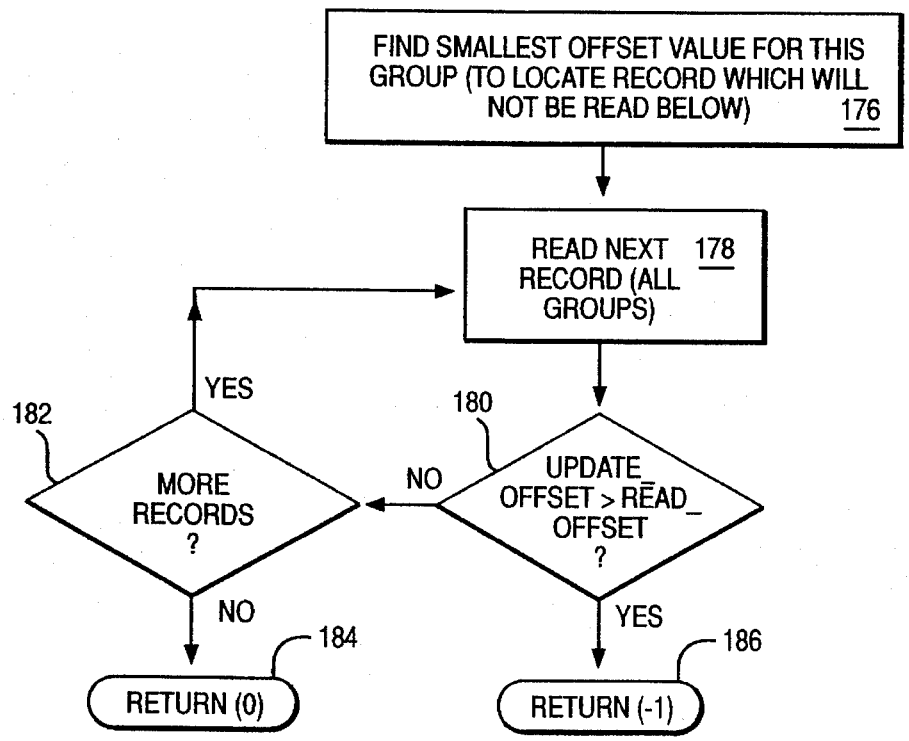
FIG. 12 is a flow diagram of a program implementing Rule #2.

Examining briefly the flow diagrams for code implementing each of the rules in FIGS. 11–13, it will be noted that if all the records of a group have been scanned, the particular rule's function will provide a "return (0)" as shown at block 174 (FIG. 11), block 184, (FIG. 12), block 196 (FIG. 13). Conversely, until all of the records for a given group have been scanned and operated upon by a given rule, each rule's function will provide a different return "return (–1)" shown at block 170 (FIG. 11), block 186, (FIG. 12), and block 198 (FIG. 13).

Returning back to FIG. 10, a test is therefore provided, block 160, to determine upon execution of a given rule's code (FIGS. 11–13), whether the function has returned a "0" (indicating that the criteria for the particular rule has been met and there are no records remaining for a group upon which the given rule is operating). If, in response to the test 160, a "–1" return is provided in response to execution of a given rule's code of FIGS. 11–13, the right path of block 160 is followed, looping back to increment N, block 154 to continue the process of FIG. 10. Assuming in a next test of whether N exceeded the number of rules being scanned (block 156), that this is not the case, (e.g. not all of the rules have been scanned and implemented), once again the process exits the bottom of block 156 to call the next rule. (It will be recalled that since N has been incremented by 1 at block 154, the next rule is then called, 158).

The foregoing process continues with block 160 testing the returns of the rule functions and looping back when records remain for each group and each rule. However, upon block 160 detecting a return code of 0, exiting block 160 causes execution of block 162 wherein the current string PTR is set equal to the given rule number's pointer, e.g. current string PTR=Rule #N PTR. The process then returns control at block 164. Upon block 156 determining that N is greater than the number of rules for a given group, the process with respect to blocks 158, 160, and 154 will no longer be followed, and flow drops out to the left or "yes" path of block 156.

FIG. 14 illustrates the steps performed by the system in the condition when N=1, e.g. when the first rule is being executed. First, at block 166, a record is read for a given group. A test is then performed of whether the update_offset is greater than the read_offset, block 168. If so, the function returns a "–1", block 170 and the previously described looping process of FIG. 10 continues. If, on the other hand, the update_offset is not yet greater than the read_offset, the process of FIG. 11 exits block 168 along the left path to test for whether there are records remaining for a particular group, 172. If so, the process loops back to block 166 to read the next record for the group. If, on the other hand, as a result of the test for remaining records, 172, the process detects that no remaining records exist for a given groups the process falls out at the bottom of block 172 and returns a "0", block 174.

Turning to FIG. 12, the process is illustrated for a subroutine implementing Rule #2. First, the process locates the smallest offset value for a given group in order to locate a record which will not be read in the following process steps, shown at block 176. The next record will be then read, block 178, for all groups whereupon a test is then made in like manner to that with respect to Rule #1 of FIG. 11, e.g. it is determined whether the update_offset is greater than the read_offset. Also in like manner to FIG. 11, if this is the case, the function returns a "–1", block 186. If, on the other hand, the update_offset is not yet greater than the read_offset, the process exits to the left of block 180 to again test for whether there are remaining records for a particular group. If not, the function returns a "0", at block 184. If, on the other hand, records remain for the given group to be read, the process exits along the upper "yes" path of block 182, returning to block 178 wherein the next record is read.

Finally, turning to FIG. 13, a subroutine is therein illustrated for effecting Rule #3. First, a function call is made execute Rule #1, block 188. Upon receiving a return code of "0" from execution of the Rule #1 function, shown at block 190, the process exits along the rightmost "yes" path from block 190. This signifies that all of the group elements for the groups have been tested with respect to Rule #1. The function of FIG. 3 will accordingly return a "–1", shown at block 198. If the test for a return code "0" in block 190 has failed, the process follows through block 190 out the lowermost "no" path, whereupon a function call is issued to call the subroutine hereinbefore described with respect to FIG. 12, implementing Rule #2 (shown at block 192 of FIG. 13). Once again, a test is made for a return code "0" from this function of Rule #2 in FIG. 2, shown at block 194 of FIG. 13. If the return code is "0", the process exits the rightmost "yes" path of block 194, providing a "–1" return, block 198. On the other hand, if, in response to the return code test at block 194, the Rule #2 process of FIG. 12 does not return a "0" (e.g. it returns a "–1"), the process follows through the lowermost "no" path of decision block 194 to issue a "0" return at block 196.

The process then continues at block 138 to render position-sensitive fields employing the offsets and current string pointers shown in the table. This rendering may take the form of altering the appropriate position-sensitive variable portions of a citation in the case of the example given, and providing an output of the document automatically formatted in the desired form, such as in a text file for storage, on a printer, or on the display 38 of FIG. 1. The process will then exit at point 122 and loop back to the entry point at the top of FIG. 8 to continue processing additional edits or updates.

While the invention has been shown and described with reference to particular embodiments thereof, it will be understood by those skilled in the art that the foregoing and other changes in form and detail may be made therein without departing from the spirit and scope of the invention.

I claim:

1. A computerized method for modifying data in position-sensitive fields of a document, comprising the steps scanning the document to detect position-sensitive fields;

maintaining a table of data associated with said position-sensitive fields:
  entering records each corresponding to one said position-sensitive fields in said table, each of said records having associated therewith in said table
    a group;
    a group element;
    an offset;
    a number corresponding to a total number of position-sensitive rules to which said records in a respective group in said table must comply;
    a current string pointer; and
    a plurality of pointer each associated with a different one of said rules;
  detecting a change of relative position of said fields; and
  modifying said table in response to said detecting.

2. An apparatus for modifying data in position-sensitive fields of a document, comprising:
  means for scanning the document to detect position-sensitive fields;
  means for maintaining a table of data associated with said position-sensitive fields:
    means for entering records each corresponding to each of said position-sensitive fields in said table, each of said records having associated therewith in said table
      a group;
      an group element;
      a number corresponding to a total number of position-sensitive rules to which said records in a respective group in said table must comply;
      a current string pointer and;
      a plurality of pointers each associated with a different one of said rules;
  means for detecting a change of relative position of said fields in said document; and
  means for modifying said table in response to said detecting.

* * * * *